No. 728,409. PATENTED MAY 19, 1903.
E. C. POLLARD.
GEARED DRIVING ATTACHMENT FOR MEAT CHOPPERS.
APPLICATION FILED MAY 5, 1902.
NO MODEL.

WITNESSES:
J. B. Townsend
Ada H. Pond

INVENTOR.
Edward C. Pollard,
BY
Samuel N. Pond,
ATTORNEY.

No. 728,409. Patented May 19, 1903.

UNITED STATES PATENT OFFICE.

EDWARD C. POLLARD, OF AUSTIN, ILLINOIS.

GEARED DRIVING ATTACHMENT FOR MEAT-CHOPPERS.

SPECIFICATION forming part of Letters Patent No. 728,409, dated May 19, 1903.

Application filed May 5, 1902. Serial No. 105,970. (No model.)

*To all whom it may concern:*

Be it known that I, EDWARD C. POLLARD, a citizen of the United States, residing at Austin, in the county of Cook and State of Illinois, have invented certain new and useful Improvements in Geared Driving Attachments for Meat-Choppers and other Machines, of which the following is a specification.

My invention relates to a new and improved geared driving mechanism and has been designed for use more especially in connection with the cutter-shaft of meat and food choppers and other analogous hand-operated machines; and the principal object of my invention is to produce a driving mechanism characterized by simplicity and compactness of the driving connections, together with a facility for readily changing the speed with which the driven shaft may be operated through an interchange of one of the gear elements, which latter result is secured by the employment of an adjustable gear-carriage carrying the principal elements of the driving mechanism and capable of being adjusted in a direction transversely of the driven shaft actuated thereby.

A further object of my invention as applied to a meat or food chopper is to so locate the driving adjustment relatively to the cutter-shaft as to permit of the latter being readily removed from the outer casing of the machine for the purpose of being cleaned without interference by the driving attachment itself.

To these and other minor ends my invention consists in a driving attachment having the peculiarities of construction, adjustment, and organization of parts, all as hereinafter described, and more particularly defined in the appended claims.

My invention is illustrated in the accompanying drawings, in which—

Figure 1:
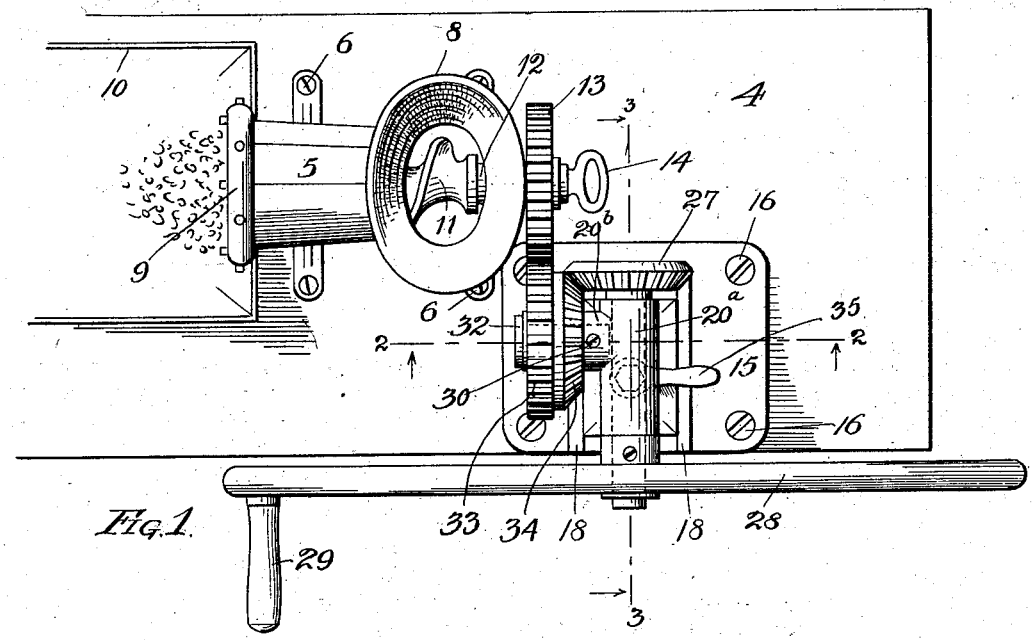
Figure 2:
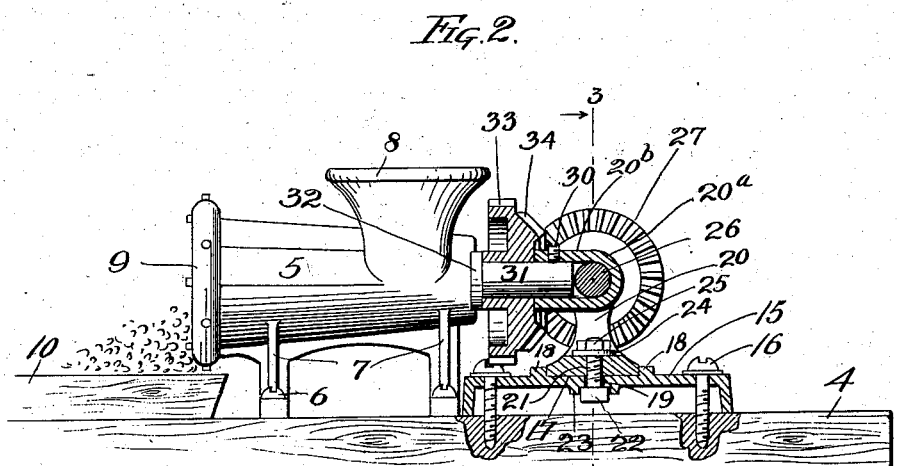
Figure 3:
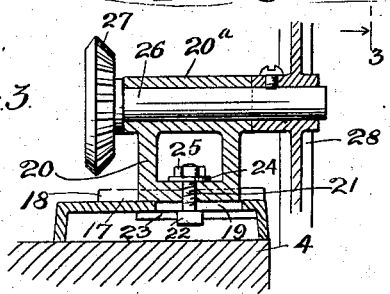

Figure 1 is a top plan view of my improved driving attachment as applied to a meat-chopping machine. Fig. 2 is a side elevation of the body or casing of the chopper with certain parts of the driving-gear in transverse vertical section on the line 2 2 of Fig. 1 looking in the direction of the arrows, and Fig. 3 is a vertical sectional view at right angles to and on the line 3 3 of Fig. 2 looking in the direction of the arrows.

In the drawings, 4 designates a base-plate or support for the machine, which may be the top of a table or counter located at a suitable height to support the machine in a position to be easily and conveniently operated.

5 indicates the body or casing of the chopper, which is secured to the base or support 4 longitudinally thereof by means of screws or bolts 6, passing through the bases of suitable supporting-standards 7, which underlie the body of the machine.

8 indicates the hopper through which the meat or other material to be chopped is introduced, and 9 indicates the point of the machine at which the chopped meat or other product is discharged into a suitable receiving pan or tray 10.

Within the body or casing 5 are the usual feed-screw 11 and rotary cutter (not shown) fast on the longitudinal cutter-shaft 12. On the inner end of the shaft 12 is non-rotatably mounted a gear 13, which may be removably secured in operative position on the end of the shaft 12 by means of a thumb-screw 14 or other equivalent device.

The parts thus far described are old and well known in meat-chopping machines, and I will next describe those features of improvement wherein my present invention consists. Secured to the support 4 to one side of the rear end of the chopper-body is a hollow base-plate 15, through the four corners of which pass screws 16 to unite the same rigidly with the underlying support. Transversely of the upper face of the base-plate 15 and substantially centrally thereof is located a guide or way 17, which is preferably formed by means of a pair of parallel upstanding ribs 18 on the upper face of the base-plate. The bottom of the way 17 is provided with a slot 19, formed therethrough and extending centrally and longitudinally thereof for a distance sufficient to afford a certain adjustment to the driving mechanism, as hereinafter more particularly described. In the way 17 is seated the base of a gear-carriage 20, which latter has formed therethrough a vertical hole to receive therein a threaded clamping-bolt, (designated by 21.) The lower end of this bolt has a square head 22, which is preferably confined on two opposite sides thereof by parallel guide-ribs 23 on the under side of the hollow base-plate 15 and forming on the under side of the base-plate a transverse way to guide and support the head 22 of the clamping-bolt. The upper end of the bolt 21, which extends up into the open web of the gear-carriage, has applied thereto a washer 24 and a nut 25, whereby the gear-carriage may be adjustably clamped in any desired position transversely of the base-plate 15. The gear-support 20 carries at its upper end longitudinally thereof a horizontal sleeve $20^a$, constituting a journal-bearing for a power-shaft 26, on the inner end of which is keyed fast an outwardly-facing bevel-gear 27, while the outer end of the shaft 26 has keyed thereon the hub of a fly-wheel 28, adapted to be rotated by a handle 29 in an obvious manner.

The bearing-sleeve $20^a$ has formed integral therewith a short laterally-projecting sleeve $20^b$, in which latter is keyed or clamped, as by a set-screw 30, a stub-shaft 31, the outer end of which has a retaining-collar 32, constituting an abutment for the hub-sleeve of a gear 33, adapted to be journaled on said stub-shaft. As shown in Fig. 1, the gear 33 is adapted to directly mesh with and drive the gear 13 on the cutter-shaft 12, while on the face of the gear 33 is formed integrally or otherwise a bevel-gear 34, which meshes with and is driven by the bevel-gear 27, already described.

35 designates a spanner-wrench having a head of a form and size to fit over the nut 25 to effect the loosening and tightening of the clamping-bolt 21 in adjusting the gear-carriage.

The operation and advantages of my improved driving attachment in connection with the cutter-shaft of the meat-chopping machine are obvious from the foregoing description and the drawings. The parts being assembled and arranged as shown, the turning of the fly-wheel 28 effects the simultaneous rotation of the cutter-shaft 12 through the shaft 26, bevel-gears 27 and 34, and direct driving-pinions 33 and 13. It will be observed that the connected gears 33 and 34 are simply loosely mounted on the stub-shaft 31, while the latter itself is removably held to its seat in the lateral sleeve $20^b$ by means of the set-screw 30. This affords a very simple and easy manner of mounting these intermediate driving-gears and facilitates the accurate alinement of the gears 33 and 13. It also permits the withdrawal of the bevel-gear 27 and its shaft 26 upon removing the fly-wheel from the latter without disturbing the gears 33 and 34 and their supporting-shaft, and the relative location of the gears 33 34, as shown and described, affords a long bearing for the power-shaft 26, at the same time preserving the compactness of the driving mechanism. The principal object, however, of the construction and relative arrangement of the driving mechanism herein shown and described resides in the fact that by the transverse adjustment of the gear-carriage the gear 13 can be removed and a larger or smaller gear substituted therefor, after which the gear-carriage can be adjusted to throw the gear 33 into mesh with the new gear 13, thus providing for variations in the driving-gear to effect varying speeds of the cutter-shaft. The same variations in speed can be effected in machines having a non-removable driving-gear on the cutter-shaft by replacing the combined gears 33 34 on the stub-shaft by another similar pair of gears wherein the gear 33 is relatively larger or smaller, the described manner of mounting the connected gears 33 34 and the described adjustment of the gear-carriage readily permitting such interchange. Not only does the device permit the interchange of various-sized gears to the cutter-shaft or stub-shaft, but it permits the ready withdrawal of the cutter-shaft and screw through the inner or hopper end of the cutter-body in that class of machines which provides for such withdrawal of the cutter-shaft and screw. Furthermore, the driving mechanism described presents a highly-desirable compactness. With the power-shaft disposed at right angles to the cutter-shaft a pair of bevel-gears are practically unavoidable somewhere in the connection between the two shafts, and my invention disposes of these bevel-gears in such a manner as to economize space and permit variations in speed through the substitution of a larger or smaller gear for one of the driving-gears of the train without affecting the operativeness and easy-running quality of the driving mechanism as a whole and requiring no other adjustment than an inward or outward set of the gear-carriage on its base-plate through a simple manipulation of the clamping-bolt 21.

I claim as my invention—

1. In a geared driving attachment of the character described, the combination with a base-plate having a way formed thereon, the base of said way being longitudinally slotted, of a gear-carriage mounted in said way, a clamping-bolt passed through the base of said gear-carriage and engaging said slot in the base of the way, a power-shaft journaled in and longitudinally of the top of said gear-carriage, a power-receiving device on the outer end of said shaft, a bevel-gear on the inner end thereof, a laterally-extending stub-shaft removably secured in said gear-carriage, a spur-gear loosely mounted thereon, and a bevel-gear fast on the inner face of said spur-gear and intermeshing said bevel-gear on the power-shaft, substantially as described.

2. In a geared driving attachment of the character described, the combination with a hollow base-plate having ways formed across the upper and under faces thereof and slotted longitudinally of said ways, of a gear-carriage mounted in said upper way, a clamping-bolt passed through the base of said gear-carriage and through said slot and having on its lower end a square head riding in said lower way, a power-shaft journaled in and longitudinally of the top of said gear-carriage, a fly-wheel having a handle fast on the outer end of said power-shaft, a bevel-gear on the inner end thereof, a laterally-extending stub-shaft removably secured in said gear-carriage in the same horizontal plane as said power-shaft, a spur-gear loosely mounted thereon, and a bevel-gear fast on the inner face of said spur-gear and intermeshing said bevel-gear on the power-shaft, substantially as described.

In witness whereof I have hereunto subscribed my name in the presence of two witnesses.

EDWARD C. POLLARD.

Witnesses:
SAMUEL N. POND,
F. B. TOWNSEND.